United States Patent [19]

Suzuki

[11] Patent Number: 4,603,957

[45] Date of Patent: Aug. 5, 1986

[54] SWITCH STATE DETECTING APPARATUS FOR A CAMERA

[75] Inventor: Nobuyuki Suzuki, Kanagawa, Japan

[73] Assignee: Canon Kabushiki Kaisha, Tokyo, Japan

[21] Appl. No.: 701,094

[22] Filed: Feb. 13, 1985

[30] Foreign Application Priority Data

Feb. 13, 1984 [JP] Japan .................................. 59-24680

[51] Int. Cl.⁴ ......................... G03B 7/00; G03B 17/00
[52] U.S. Cl. ..................................... 354/410; 354/202
[58] Field of Search ............... 354/410, 412, 484, 486, 354/202, 289.1, 289.12

[56] References Cited

U.S. PATENT DOCUMENTS 4,492,450 1/1985 Watanabe et al. ............. 354/412 X

*Primary Examiner*—William B. Perkey
*Attorney, Agent, or Firm*—Toren, McGeady, Stanger, Goldberg & Kiel

[57] ABSTRACT

A detecting apparatus for detecting the state of switch means operatively associated with the release operation or the like is disclosed. The cycle of sampling pulse for detecting the state of the switch to be applied to the switch means when the use of the photographing apparatus is selected by operation means is made shorter than that when the non-use of the photographing apparatus is selected. The power consumption due to the application of the sampling pulses in case the detection of the switch detection is not necessary is prevented, while the change of the state of the switch means can be detected efficiently when the detection of the switch state is necessary.

16 Claims, 6 Drawing Figures

SWITCH STATE DETECTING APPARATUS FOR A CAMERA

BACKGROUND OF THE INVENTION

1. Field of the Invention

The present invention relates to an operation state detecting circuit for a camera.

2. Description of the Prior Art

The photography operation is started, whether the release operation has been done or not after it has been judged that the power source of the camera is switched on.

In order to detect the photography operation, switches operatively associated with operation members are provided and the state of each switch is detected.

The switch state detecting circuit, constructed as shown in FIG. 1, is known.

In FIG. 1, reference numeral 1 identifies a battery, a switch 100 is operatively associated with the operation member, an inverter circuit 15 is composed of the CMOS, and a pull-up resistor 14 for fixes the gate level of the inverter circuit 15.

In the detecting circuit in FIG. 1, when the switch 100 is closed, a current is supplied to the pull-up resistor 14 to make the level of the input to the inverter circuit 15 low and the output level of the inverter circuit 15 high, while when the switch 100 is opened the input level of the inverter circuit 15 is fixed high and the output level of the inverter circuit 15 is made low by the pull-up resistor 14 in such a manner that the on or off condition of the switch 100 is detected by the output of the inverter circuit 15.

Such a conventional detecting circuit has shortcomings such that power consumption is increased, since current is always supplied to the resistor 14 when the switch 100 is closed.

Furthermore, in order to lower the power consumption when the switch 100 is closed, by eliminating the above shortcomings, it has been proposed as shown in FIG. 2(a) to supply the pull-up resistor 14 with a sampling pulse of a predetermined duty as shown in FIG. 2(b).

In FIG. 2(a), the parts having the same reference numerals as those in FIG. 1 are the same parts. In FIG. 2(a), the sampling pulse as shown in FIG. 2(b) is delivered from a sampling pulse producing circuit 17 to the pull-up resistor 14 via a buffer 16. Furthermore, the sampling pulse producing circuit 17 is connected to an RS Flip-Flop 19 (hereinafter called RSFF 19) to be set with the sampling pulse. Furthermore, the reset terminal of the RSFF 19 is connected to the output terminal of the inverter circuit 15 via an inverter 18. Hereby, the RSFF 19 is constructed with a reset priority.

Because in the circuit shown in FIG. 2(a), when the switch 100 is opened the output level of the inverter circuit 15 is low and a high level is applied to the reset terminal of the RSFF 19 via the inverter 18, the Q output level of the RSFF 19 remains low.

Furthermore, when the switch 100 is closed the output level of the inverter circuit 15 is high and a low level is applied to the reset terminal of the RSFF 19 while the RSFF 19 is reset when the above sampling pulse rises so that the Q output continues to deliver a high level. Thus, also in the this circuit the closed condition of the above switch 100 can be detected by the Q output of the RSFF 19.

In the circuit constructed as shown in FIG. 2(a), when the switch 100 is closed, the current flows through the pull-up resistor 14 only while the level of the above sampling pulse is high so that the power consumption is largely decreased as compared with that shown in FIG. 1.

Taking the power consumption in the above pull-up resistor 14 into consideration, it is sufficient to make the duty of the above sampling pulse small, namely the off time of the pulse in FIG. 2(b) as long as possible as compared with the on time. However, taking the sampling cycle of the switch state into consideration, it is impossible to set the above off time too long.

Namely, when, for example, the above switch 100 is operatively associated with the release operation member of the camera to start supplying current to the light measuring circuit with detection of the switch 100 closing or actuation of the release circuit, the detecting cycle of the switch 100 condition coincides with the sampling cycle at its longest, so that unless the above sampling cycle is set at about 100 msec. at its longest, it takes time to actually start light measuring with the release operation or to start the release operation and therefore there is a danger that the shutter chance might not be obtained.

It is, accordingly, an object of the present invention to eliminate the inconvenience of the above conventional apparatus by making the number of detecting operations per unit time of the detecting operation when detection of the switch condition is necessary or the apparatus is used, greater than ordinary or when the apparatus is not used.

Other purposes and features of the present invention will become apparent from the following description of the embodiment of the present inventin with reference to the accompanying drawings.

SUMMARY OF THE INVENTION

According to the present invention, the applied condition of the electrical signals (pulses) per unit time for detecting the condition of the switch means to be applied to the switch means when the apparatus is used is different from that when the apparatus is not used to eliminate the shortcoming of the above conventional apparatus (the applied condition of the electrical signals per unit time when the apparatus is used is greater than that when the apparatus is not used, or the pulse cycle when the apparatus is used is shorter than that when the apparatus is not used).

DETAILED DESCRIPTION OF THE PREFERRED EMBODIMENT

Figure 3:
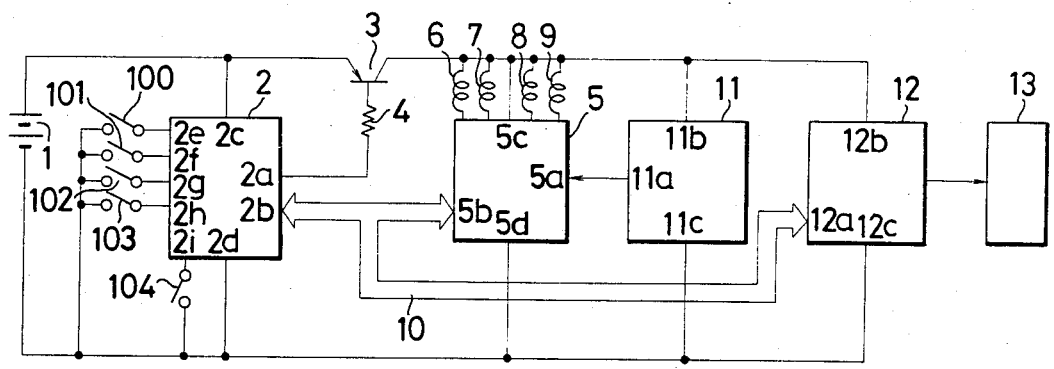
FIG. 3 is a circuit diagram showing an embodiment of a control circuit for a camera to which the switch condition detecting circuit of the present invention is applied.

FIG. 3 is a circuit diagram showing an embodiment of a control circuit for a camera to which the operation condition detecting circuit of the present invention is applied.

In the drawing, reference battery and 2 is a microprocessor composed of, for example, a CMOS between whose current supply terminals 2c and 2d the above battery 1 is connected in such manner that the microprocessor 2 is always ready to be supplied with a current. The switch 100 is operatively associated with a slide operation member (not shown) to be closed in the lock mode and opened when it is set in the advance mode, switches 101, 102 are respectively closed with the first and the second strokes of the release operation member, and a switch 103 sets the film sensitivity, whereby every time the switch 103 is closed or while the switch 103 is being closed, the clock is counted so as to renovate the set value of the film sensitivity. Reference numeral 104 identifies a photography mode selecting switch, whereby every time the switch 104 is closed or while the switch 104 is closed, the clock is counted in such a manner that the set photography mode is changed over to another mode at every count of the clock.

Each of the above switches 100, 102, 103 and 104 is connected to each terminal 2e–2i of the microprocessor 2, which detects the state of each switch 100, 101, 102, 103, 104, to supply the current, the calculation and so on.

A current supply transistor 3 whose switching is controlled by the microprocessor 2 to supply a current to the circuits will be explained later. Reference numeral 11 identifies a light measuring circuit, and reference numeral 5 identifies an interface circuit including an AD converting circuit to whose input terminal 5a the light measurement output from an output 11a of the above light measuring circuit 11 is input to carry out the A/D conversion and a control circuit for controlling the magnet. A bus line 10 alternatively transfers the data from a data terminal 2b of the microprocessor 2 and the data from the interface circuit 5 and is also connected to an input terminal 12a of a display control circuit 12. Reference numeral 13 identifies a display.

Figure 4A:
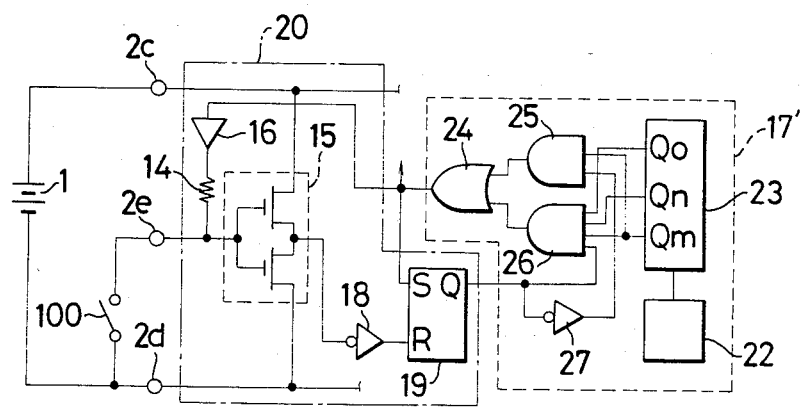
FIG. 4(a) is a circuit diagram showing an embodiment of the switch condition detecting circuit of the present invention.

FIG. 4(a) shows a detecting circuit 20 of the present invention for detecting the switch 100 condition shown in FIG. 3 and is provided at the input part of the above microprocessor 2.

Figure 1:
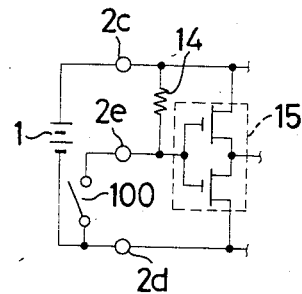
FIG. 1 is a circuit diagram showing an example of the conventional switch condition detecting circuit.
Figure 2A:
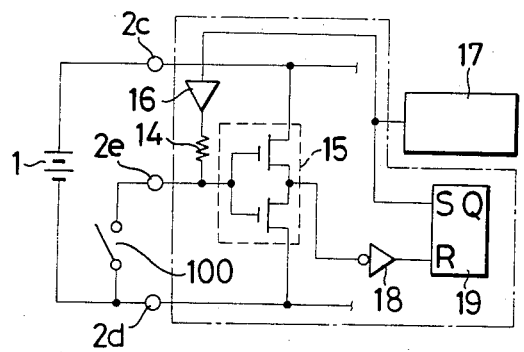
FIG. 2(a) is a circuit diagram showing another example of the conventional switch condition detecting circuit.
Figure 2B:
FIG. 2(b) is a wave form chart explaining the operation of the detecting circuit shown in FIG. 2(a).

The parts in FIG. 4(a) the same in FIG. 2(a) are the same parts.

A pulse generating circuit 17 produces the sampling pulse of a different duty. The circuit 17' includes a frequency dividing counter 23 (binary counter) for dividing the frequency of the pulse from a pulse producing circuit 22, an AND gate 26 for making AND of the output pulses from output terminals Qo, Qn and Qm of the frequency dividing counter 23 to deliver a pulse (II) shown in FIG. 4(b), an AND gate 25 to be supplied with the output pulse from the output terminal Qm of the above frequency dividing counter 23 to deliver a pulse (I) shown in FIG. 4(b), an OR gate 24 and an inverter 27.

Hereby, in the embodiment, only the detecting circuit 20 for the switch 100 is shown, whereby for each switch 101–104 a detecting circuit 20 is provided, while the sampling pulses for each detecting circuit 20 are supplied from the pulse producing circuit 17'.

Below, the operation of the embodiment shown in FIGS. 3, 4(a) and 4(b) will be described.

First the slide operation members (not shown) are set in the lock mode.

Because in this case the switch 100 is closed, the RSFF 19 is set, while a high level is delivered from the Q output. Thus, the gate 25 is prohibited and the gate 26 is selected. Thus, from the OR gate 24, the sampling pulses (II) shown in FIG. 4(b) are delivered. Because the cycle of the sampling pulse (II) is set at about 800 msec., the power consumed in the resistor 14 when the switch 100 is closed is remarkably low as compared with the conventional one (FIG. 2(a)).

Furthermore, because the sampling pulse (II) is transmitted to the detecting circuits of the other switches 101–104, power consumption in every detecting circuit of the switches 100–104 is also low in the same manner as in the above case.

Because in this way the level of the Q output of the RSFF 19 is high when the switch 100 is closed, the microprocessor 2 prohibits control by other switch operations with the on-signal of the switch 100, whereby even if the release operation member is operated in this state, light measuring or exposure operation is not started.

When after that the advance mode is set by operating the above slide operation member, the switch 100 is open. Because the output level of the inverter circuit 15 becomes low, a high level signal is applied to the reset terminal of the RSFF 19 via the inverter 18 so that from the output of the RSFF 19 a low level signal is delivered.

Figure 4B:
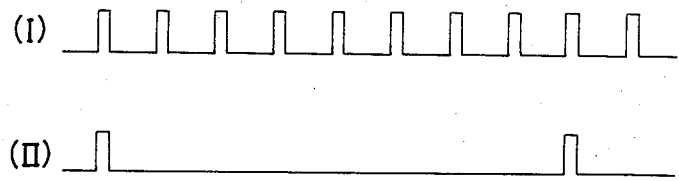
FIG. 4(b) is a wave form chart explaining the operation of the detecting circuit shown in FIG. 4(a).

Consequently, the gate 25 is selected in place of the gate 26, and from the OR gate 24 the pulse (I) shown in FIG. 4(b) is delivered. The cycle of the pulse (I) is selected at 100 msec., namely about ⅛ of the sampling pulse (II) in the above locked mode, so that the sampling cycle to each switch 101–104 after that becomes quicker.

Furthermore, the level of the Q output of the above RSFF 19 becomes low so that the microprocessor 2 is changed a condition ready to accept the switch condition after that.

When after that the switch 101 is closed with the first stroke of the release operation member, the RSFF 19 of the same construction as that of the above detecting circuit 20 provided for detecting the on-state of the switch 101 is set by the pulse (I) shown in FIG. 4(b) from the above OR gate 24, and the on-signal of the switch 101 is input into the microprocessor 2. Because at this time the cycle of the sampling pulse (I) is short as shown in FIG. 4(b) in the advance mode as mentioned above, the switch 101 carries out on-signal detection immediately with the first stroke of the release operation.

When in this way on-signal detection of the switch 101 is carried out from the output 2a of the microprocessor 2, a low level signal is delivered to switch on the transistor 3 and supply the current supply to each circuit. Thus, the light measuring circuit 11 produces a voltage corresponding to the brightness to be transferred to the interface circuit 5. Furthermore, because the microprocessor 2 transmits the AD conversion start order to the interface circuit 5 via the bus line 10 so that the AD conversion of the brightness information is carried out in the interface circuit 5, whereby the AD conversion value is put into the microprocessor 2 via the line 10.

The microprocessor 2 calculates the AD conversion value and the film sensitivity information etc. preset and stored in the switch 103 and delivers the calculated result to the interface circuit 5 and a display control circuit 12 via the line 10. The display control circuit 12 delivers the calculated result to the display 13 to display the exposure value.

After then, with the second stroke of the release operation the switch 102 is closed, thus the on-signal is detected by the sampling pulse (I) shown in FIG. 4(b) as mentioned above, closing of the switch 102 is detected by the microprocessor 2, which transfers the release signal to the interface circuit 5 via the line 10 to actuate a release magnet 6 and control the aperture based on the calculated result by the conventional method, a current is supplied to a magnet 7 when the aperture reaches a predetermined value in order to determine the aperture. After that the current is supplied to a magnet 8 to allow the leading shutter curtain to run, actuate a magnet 9 after the lapse of the shutter time based on the calculated result to allow the tail shutter curtain to start to run, and complete the exposure.

As explained above, in the case of the switch condition detecting circuit of the present invention, the cycle of the sampling pulse to be supplied to the switch detecting circuit in the lock mode is different from that in the advance mode in such a manner that in the lock mode power consumption in the pull-up resistor 14 is minimal, while in the advance mode the cycle is made short in order immediately detect whether or not the release operation has been made or not, which is quite effective for the camera switch condition detecting circuit.

Furthermore, in the present embodiment, the cycle of the sampling pulse in the advance mode is chosen at about ⅛ that in the lock mode, whereby it goes without saying that the current runs continuously in the pull-up resistor 14 in the advance mode.

Furthermore, the cycle of the sampling pulses for the switch 100 is constant regardless of the lock mode or the advance mode, while only the cycle of the sampling pulse to other switches is 101-104 variable.

Furthermore, it goes without saying that the on and off mode for the operation member for each switch 100-104 can be contrary to that of the present embodiment.

Furthermore, it is possible that, as the sampling pulse producing circuit, two clock pulses producing circuits for producing pulses of different cycles are provided to be selected by the output of the RSFF.

What is claimed is:

1. A photographing apparatus comprising:
 (a) an operation member for selecting use or non-use of the photographing apparatus;
 (b) switch means which changes its switch state in accordance with an operation of the photographing apparatus other than the operation of the photographing apparatus whose use or non-use of the photographing apparatus is selected by the operation member;
 (c) a detecting circuit for delivering an electrical signal for detecting the state of the switch so as to detect the state of the switch means; and
 (d) a control circuit for making the delivery per unit time of the electrical signal from the detecting circuit when the use of the photographing apparatus is selected different from that when the non-use is selected.

2. A photographing apparatus according to claim 1, wherein the control circuit controls the delivery per unit time of the electrical signal when the use of the photographing apparatus is selected to be larger than that when the non-use of the photographing apparatus is selected.

3. A photographing apparatus according to claim 1 or 2, wherein the control circuit delivers the electrical signal in pulse in such a manner that the delivery cycle of the pulse when the use of the photographing apparatus is selected is shorter than that when the non-use of the photographing apparatus is selected.

4. A photographing apparatus comprising:
 (a) first switch means having a first switch state and a second switch state;
 (b) second switch means having a first switch state and a second switch state;
 (c) a detecting circuit for detecting the state of the second switch means, said circuit detecting the state of the second switch means by delivering an electrical signal;
 (d) a control circuit for making the delivery per unit time of the electrical signal when the first switch assumes the first switch state different from that when the first switch means assumes the second switch state; and
 (e) a circuit which operates when it is detected by the detecting circuit that the second switch means has been changed over from the first to the second switch state in case the first switch means is in the second state.

5. A photographing apparatus according to claim 4, wherein the control circuit controls the delivery of the electrical signal per unit time when the first switch means is in the second switch state to be larger than that when the first means is in the first switch state.

6. A photographing apparatus according to claim 4 or 5, wherein the electrical signal is delivered in pulse, while the control circuit controls the pulse cycle when the first switch means is in the second switch state to be shorter than that when the first switch means is in the first switch state.

7. A photographing apparatus according to claim 4 or 5, where in the first switch means assumes the second switch state when the use of the photographing apparatus is selected, being operatively engaged with a selection operation member which selects use or non-use of the photographing apparatus, while the second switch means is operatively engaged with a release operation member or an information or photographingmode setting operation member so as to assume the second switch state with the operation of the member.

8. A photographing apparatus having a detecting circuit for detecting a state of a switch means, comprising:
 (a) a control circuit for making the number of detection operations per unit time of the detecting circuit to detect the state of a switching means different when the apparatus is in a first state from when the apparatus is in a second state; and
 (b) an operation control circuit for controlling the operation of the apparatus according to the state of the switch means detected by the detecting circuit.

9. A photographing apparatus having at least first and second switch means, whereby the operation is determined according to the state of the second switch means when the first switch means is in the first state, comprising:
(a) a detecting circuit for detecting the state of the second switch means by delivering an electrical signal for detecting the state of the second switch means; and
(b) a control circuit which makes the delivery state of the electrical signal when the first switch means is in the first state different from that when the first switch means is in the second state.

10. A photographing apparatus which detects the state of switch means so as to control the operation, comprising:
(a) a detecting circuit for applying an electrical signal to the switch means so as to detect the switch state of the switch means;
(b) selecting means for selecting use or non-use of the photographing apparatus, and
(c) a control circuit for controlling the application per unit time of the electrical signal to the switch means when the use is selected by the operation means is larger than that when the non-use is selected.

11. A photographing apparatus which detects a state of a switch means so as to control the operation, comprising:
(a) a detecting circuit which applies an electrical signal to the switch means so as to detect the switch state of the switch means; and
(b) a control circuit for making different the timing of adding an electrical signal to the switching means in accordance with a state of the apparatus.

12. A photographing apparatus according to claim 11, wherein the control circuit changes the application per unit time of the electrical signal.

13. A photographing apparatus which includes a detecting circuit for detecting the state of switch means operatively associated with an operation member so as to set a photographing mode or control the operation by detecting the state of the switch means, comprising:
(a) a detecting circuit which applies the electrical signal to the switch means so as to detect the switch state of the switch means; and
(b) a control circuit which makes the application of the electrical signal to the switch means when the detection of the switch state is necessary different from that when the detection of the switch state is not necessary.

14. A photographing apparatus according to claim 13, wherein the control circuit carries out the control in such a manner that the application per unit time when the detection of the switch state is necessary is larger than that when the detection of the switch state is not necessary.

15. A photographing apparatus which includes a detecting circuit for detecting the state of switch means operatively associated with the operation member so as to set the photographing mode or control the operation by detecting the state of the switch means, comprising:
(a) a control circuit which makes the number of the detecting operation per unit time of the switch means in the detecting circuit, when the detection of the state of the switch means is necessary different from that when the detection of the state of the switch means is not necessary.

16. A photographing apparatus according to claim 15, wherein the control circuit which makes the number of the detecting operations per unit time, when the detection of the state of the switch is necessary, greater than that when the detection of the state of the switch is not necessary.

* * * * *